US012782218B2

(12) United States Patent
Kobayashi et al.

(10) Patent No.: US 12,782,218 B2
(45) Date of Patent: Nov. 3, 2026

(54) SENSOR

(71) Applicant: TDK Corporation, Tokyo (JP)

(72) Inventors: Masanori Kobayashi, Tokyo (JP); Ken Unno, Tokyo (JP); Tetsuya Sasahara, Tokyo (JP); Tetsuo Hata, Tokyo (JP); Lucie Ouedraogo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 233 days.

(21) Appl. No.: 18/895,611

(22) Filed: Sep. 25, 2024

(65) Prior Publication Data

US 2025/0110000 A1 Apr. 3, 2025

(30) Foreign Application Priority Data

Sep. 28, 2023 (JP) ................................. 2023-168548

(51) Int. Cl.
*G01L 9/00* (2006.01)

(52) U.S. Cl.
CPC .................................. *G01L 9/0051* (2013.01)

(58) Field of Classification Search
CPC ..................................................... G01L 9/0051
See application file for complete search history.

(56) References Cited

U.S. PATENT DOCUMENTS 4,116,075 A * 9/1978 Ort ........................ G01L 1/2231 73/726
2003/0000071 A1* 1/2003 Nagakura ............... G01F 23/36 29/610.1
2011/0089160 A1* 4/2011 Kuriki ....................... H05B 3/84 219/553
2015/0362391 A1* 12/2015 Suzuki .................... G01L 19/04 137/511
2021/0063262 A1* 3/2021 Noh ...................... G01L 9/0052
2021/0076493 A1* 3/2021 Okamura ............. H05K 1/0298
2022/0155166 A1 5/2022 Kobayashi et al.

FOREIGN PATENT DOCUMENTS

JP 2020-148480 A 9/2020

* cited by examiner

*Primary Examiner* — David J Bolduc
(74) *Attorney, Agent, or Firm* — Oliff PLC

(57) ABSTRACT

A sensor including: a base material having a surface on which streaks are formed along a first direction in a plan view; and a conductive film pattern formed on or above the surface and configured to connect mutually different positions in an in-plane direction of the surface in a shape in which a length of a conductive path is longer than a length of a straight line connecting the different positions, in which in a plan view, the shape of the conductive film pattern comprises a shape in which each of straight lines parallel to the first direction passes across a conductive path center line of the conductive film pattern zero times or once but does not pass across the conductive path center line twice or more.

6 Claims, 14 Drawing Sheets

SENSOR

CROSS REFERENCE TO RELATED APPLICATIONS

The present application claims a priority under Japanese Patent Application No. 2023-168548 filed on Sep. 28, 2023, and is incorporated into the present description by referring to the entire disclosure.

BACKGROUND ART

The present disclosure relates to a sensor having a conductive film pattern.

As a sensor such as a pressure sensor, there is known a sensor in which a circuit based on a conductive film pattern is formed on a surface of a base material made of a metal, a semi-conductor, an insulating material, or the like. As a circuit, for example, there is a circuit in which strain of a base material (also referred to as membrane or diaphragm) is detected by a resistance change using a piezoresistive effect (JP2020-148480A).

In a sensor in the related art, for example, a surface is smoothed to a state called a mirror surface or the like, and then a conductive film pattern is formed on the smoothed surface of the base material. However, a processing step of mirror-finishing the surface of the base material takes time and cost, and there is a problem in productivity.

SUMMARY

The inventors attempted to form a conductive film pattern on a surface on which streaks are formed to manufacture a sensor, but found that an etching residue or the like is likely to occur in a step of forming the conductive film pattern, and a short-circuit failure caused by the etching residue or the like is likely to occur. It is desirable to provide a sensor capable of preventing a short-circuit failure of a conductive film pattern even though the conductive film pattern is formed on a surface on which streaks are formed.

A sensor according to the present disclosure including:

- a base material having a surface on which streaks are formed along a first direction in a plan view; and
- a conductive film pattern formed on or above the surface and configured to connect mutually different positions in an in-plane direction of the surface in a shape in which a length of a conductive path is longer than a length of a straight line connecting the different positions, in which
- in a plan view, the shape of the conductive film pattern comprises a shape in which each of straight lines parallel to the first direction passes across a conductive path center line of the conductive film pattern zero times or once but does not pass across the conductive path center line twice or more.

DETAILED DESCRIPTION

First Embodiment

Figure 1:
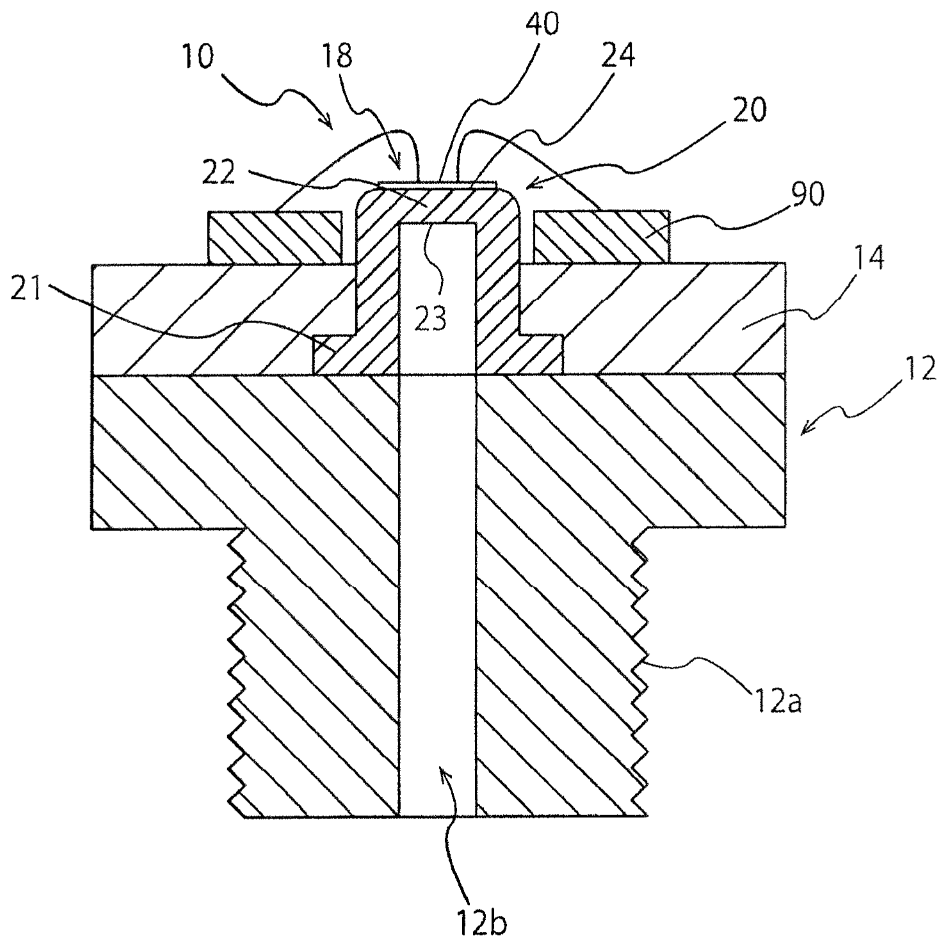
FIG. 1 is a schematic sectional view of a sensor according to a first embodiment of the present disclosure.

Hereinafter, the present disclosure will be described based on embodiments illustrated in the drawings.

FIG. 1 is a schematic sectional view of a sensor 10 according to a first embodiment of the present disclosure. The sensor 10 includes a sensor body 18 including a base material 20, a conductive film pattern 40, and the like, a connecting member 12 formed with a flow path 12*b* through which a pressure is transmitted to the base material 20, a pressing member 14 for fixing the sensor body 18 to the connecting member 12, a substrate 90 wired to the conductive film pattern 40 provided on the base material 20, and the like.

As illustrated in FIG. 1, a thread groove 12*a* for fixing the sensor 10 to a measurement target is formed in an outer periphery of the connecting member 12. By fixing the sensor 10 via the thread groove 12*a*, the flow path 12*b* formed inside the connecting member 12 is airtightly communicated with a pressure chamber filled with a fluid, which is the measurement target.

As illustrated in FIG. 1, the base material 20 has a bottomed (upper base) cylindrical outer shape also referred to as a stem or the like, and the sensor 10 including the base material 20 is provided at one end portion of the flow path 12*b* in the connecting member 12. The base material 20 is provided with a flange 21 on an opening side (Z-axis negative direction side), and the base material 20 is fixed to the connecting member 12 by the flange 21 being sandwiched between the pressing member 14 and the connecting member 12. An opening of the base material 20 and the flow path 12*b* of the connecting member 12 are airtightly coupled using the pressing member 14, and the pressure of the fluid, which is the measurement target, is transmitted to a bottom wall 22 (also referred to as membrane) of the base material 20.

Figure 12:
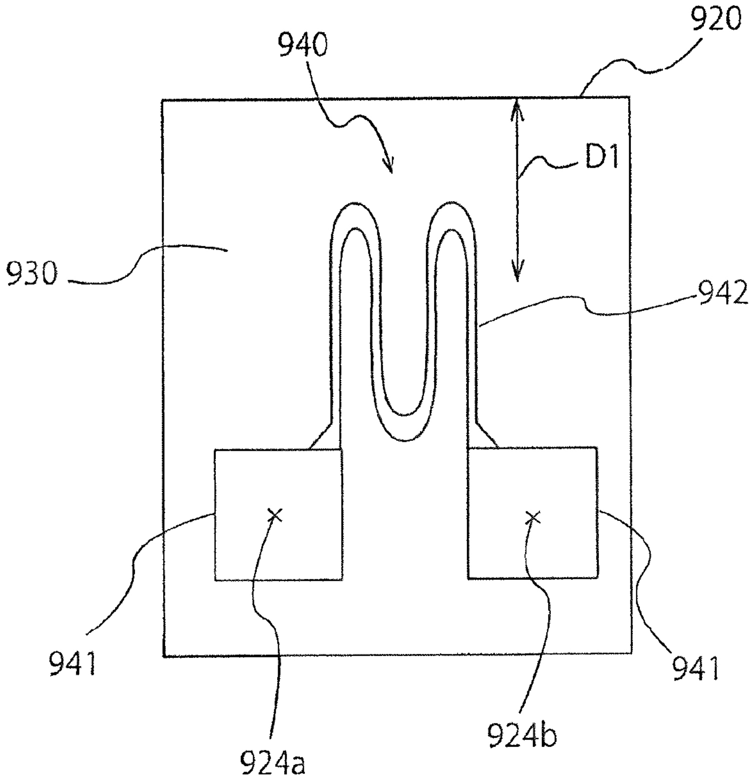
FIG. 12 is an enlarged schematic view of vicinity of a surface of a base material in a sensor according to a ninth embodiment.

In the first embodiment, the sensor 10 used as a pressure sensor for measuring the pressure of the fluid in the pressure chamber has been described as an example, but the sensor according to the present disclosure is not limited only to the pressure sensor, and a sensor other than the pressure sensor such as a strain gauge may be used (see FIG. 12). A shape of the base material 20 illustrated in FIG. 1 is not limited to only a stem shape, may be another shape having a portion such as the bottom wall 22 which is deformed by receiving a force from the measurement target, and may be, for example, a flat plate shape as illustrated in FIG. 12. Examples of a material of the base material 20 include, but are not particularly limited to, a metal material such as stainless steel, ceramics such as silicon carbide, and a semi-conductor material such as silicon. Furthermore, the material of the base material may be austenitic SUS 304, 316 or precipitation hardened SUS 630, 631 because these materials are excellent in high-temperature characteristics when a measurement environment of the sensor 10 is a high-temperature condition.

Figure 2:
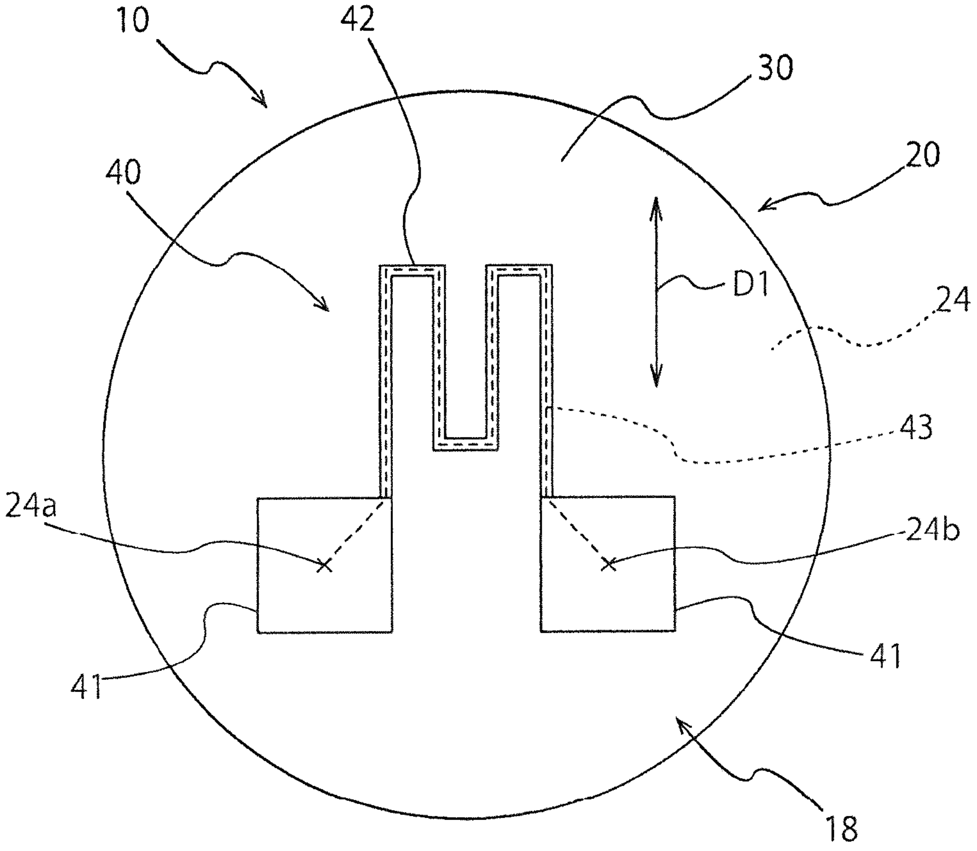
FIG. 2 is an enlarged schematic view of vicinity of a surface of a base material in the sensor illustrated in FIG. 1.

FIG. 2 is an enlarged schematic plan view of the sensor body 18 of the sensor 10 illustrated in FIG. 1 as viewed from an outer bottom surface 24 side of the bottom wall 22 of the base material 20. As can be understood from FIGS. 1 and 2, an outer bottom surface 24 of the base material 20 is a surface of the base material 20 opposite to a pressure receiving inner surface 23 that comes into contact with the fluid to be measured, and the outer bottom surface 24 is deformed according to the pressure of the fluid to be measured. The conductive film pattern 40 is formed on the outer bottom surface 24 of the base material 20, and the sensor 10 can detect a change in a resistance value of the conductive film pattern 40 due to the deformation of the outer bottom surface 24 and calculate the pressure of the fluid to be measured.

Figure 3A:
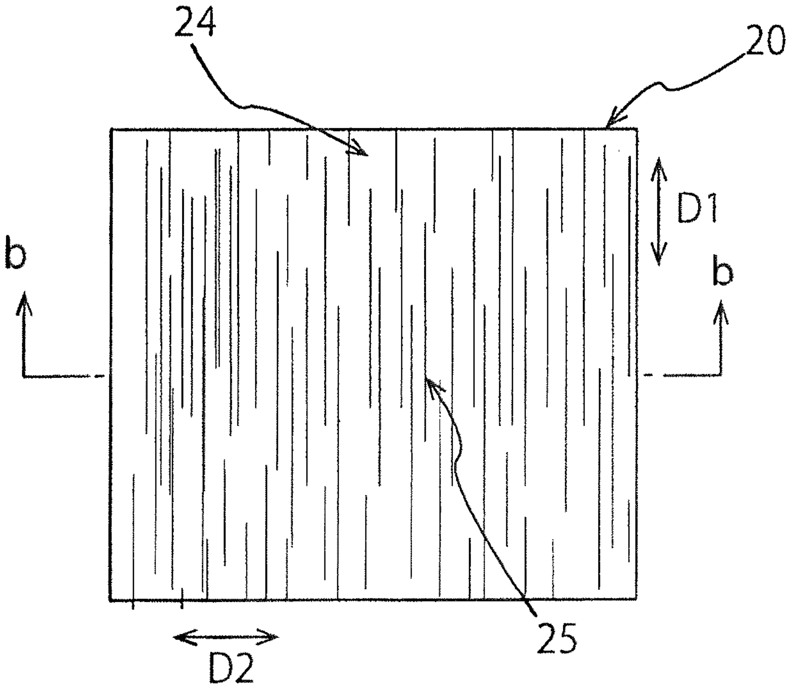
FIG. 3A is a plan view of a conceptual diagram illustrating a state of streaks formed on or above the surface of the base material illustrated in FIG. 2.
Figure 3B:
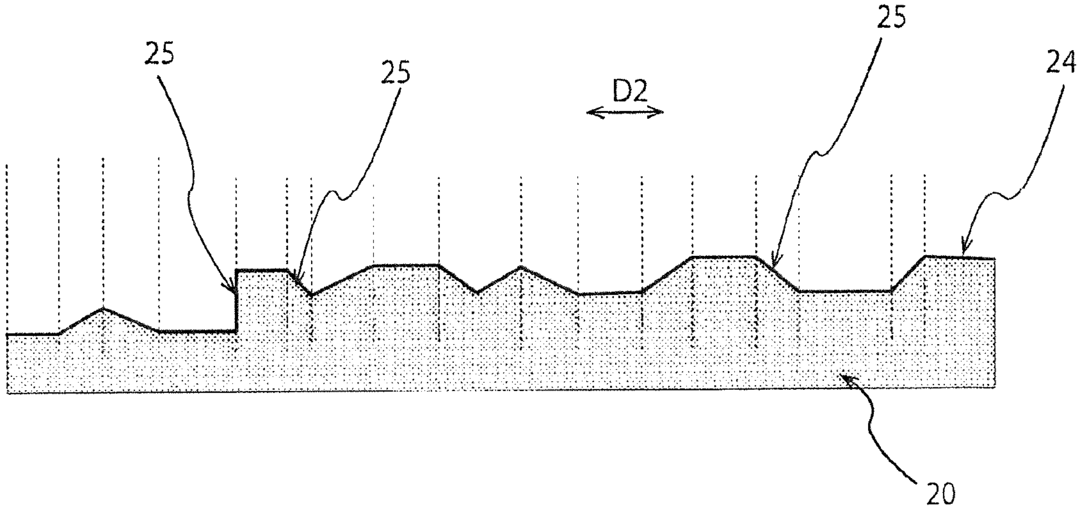
FIG. 3B is a sectional view of a conceptual diagram illustrating a state of the streaks formed on or above the surface of the base material illustrated in FIG. 2.

Although not illustrated in FIG. 2, streaks 25 (see FIGS. 3A and 3B) are formed on the outer bottom surface 24, which is a surface of the base material 20, along a first direction D1 in a plan view from a direction perpendicular to the outer bottom surface 24. FIG. 3A is an enlarged plan view in which a part of the outer bottom surface 24 of the base material 20 is enlarged, and FIG. 3B is an enlarged sectional view illustrating the streaks 25 on the outer bottom surface 24. As illustrated in FIG. 3A, it can be seen that in a case where the outer bottom surface 24 of the base material 20 is enlarged, the streaks 25 constituted by a large number of fine streaks are formed on the entire outer bottom surface 24.

As illustrated in FIG. 3B, the streaks 25 are observed as undulations formed on the outer bottom surface 24 in the enlarged section, and can also be said to be many linear scratches substantially parallel to the first direction D1 in the plan view. Examples of the undulations constituting the streaks 25 include grinding marks formed in a grinding direction during manufacturing of the base material 20 and rolling marks formed in a rolling direction during rolling, and the undulations are formed intermittently or continuously on the entire outer bottom surface 24. When a plurality of types of streaks having different formation directions in the plan view are intermittently or continuously formed on the entire outer bottom surface 24 (surface of base material), a direction of one type of streak having deeper unevenness is considered as the first direction D1. For example, when a streak of a grinding mark having an unevenness depth of 0.1 μm to 1.0 μm and a streak of a polishing mark having an unevenness depth of 0.01 μm to 0.1 μm are formed on the outer bottom surface, a direction of the streak of the grinding mark having an unevenness depth of 0.1 μm to 1.0 μm is considered to be the first direction D1.

In the sensor 10, the surface roughness Ra of the outer bottom surface 24 in the second direction D2 perpendicular to the first direction D1 in the plane of the outer bottom surface 24 may be 0.05 μm or more and 1 μm or less. When the surface roughness Ra of the outer bottom surface 24 is equal to or more than a predetermined value, an etching residue 45 (see FIG. 4) of a conductive film is likely to occur along the first direction D1, and thus an effect of preventing occurrence of a short-circuit failure due to the etching residue 45 is particularly increased. In addition, by setting the surface roughness Ra to the predetermined value or less, it is possible to form the thin conductive film pattern 40 with high accuracy.

The streaks 25 formed on the outer bottom surface 24 can be eliminated by mirror-polishing the outer bottom surface 24 before forming an underlying insulating film 30 and the conductive film pattern 40 (see FIG. 4) on the outer bottom surface 24, but in order to mirror-polish the outer bottom surface 24 to eliminate the streaks 25, processing time and cost are required, leading to reduction in productivity. On the other hand, it is possible to improve the productivity by forming the underlying insulating film 30 and the conductive film pattern 40 (see FIG. 4) on the outer bottom surface 24 in a state where the streaks 25 are formed, as in the base material 20 according to the first embodiment.

Figure 4:
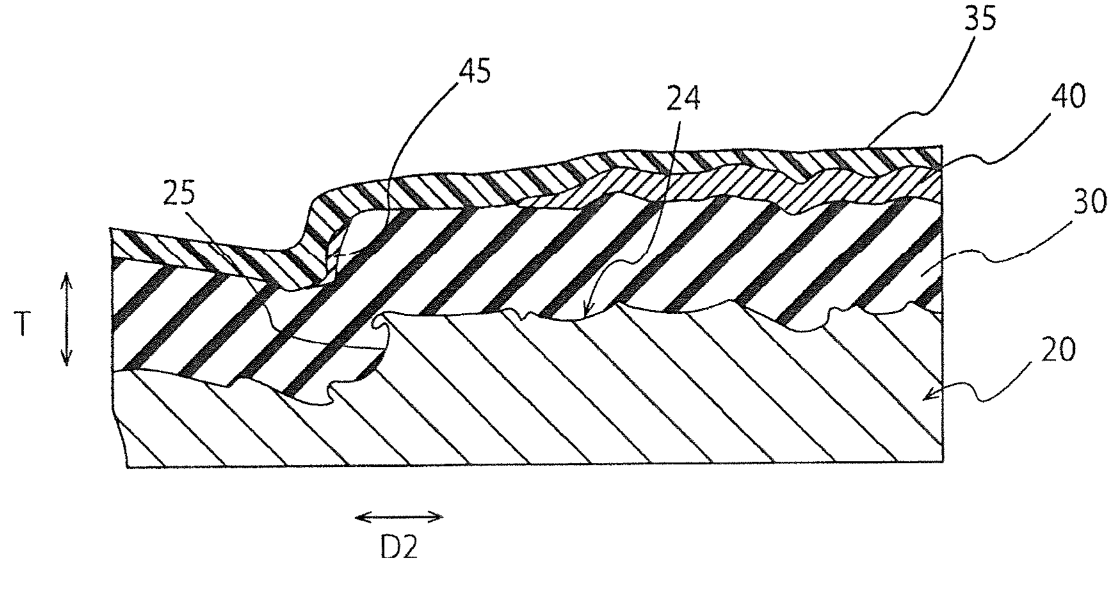
FIG. 4 is a conceptual diagram illustrating an example of a stacked state of conductive film patterns and the like formed on or above the surface of the base material illustrated in FIGS. 3A and 3B.

The conductive film pattern 40 illustrated in FIG. 2 is formed on the outer bottom surface 24 (on outer bottom surface 24 in film stacking direction) with the underlying insulating film 30 interposed therebetween. FIG. 4 is an enlarged sectional view of a periphery of the outer bottom surface 24 of the sensor 10 illustrated in FIG. 2. The underlying insulating film 30 is formed on the entire outer bottom surface 24 and secures insulating property between the outer bottom surface 24 of the base material 20 and the conductive film pattern 40. In this manner, in the sensor 10, the underlying insulating film 30 is formed between the outer bottom surface 24 and the conductive film pattern 40, and the conductive film pattern 40 is indirectly formed on the outer bottom surface 24. However, the sensor 10 is not limited to such a sensor, and the conductive film pattern 40 may be directly formed on the outer bottom surface 24 when the material of the base material 20 has an insulating property or the outer bottom surface 24 is subjected to an insulating treatment.

A thickness T (average value) of the underlying insulating film 30 is not particularly limited, but may be, for example, one time to ten times the surface roughness Ra of the outer bottom surface 24 illustrated in FIGS. 3A and 3B. The thickness T of the underlying insulating film 30 is equal to or more than a predetermined number of times the surface roughness Ra of the outer bottom surface 24, so that the insulating property between the base material 20 which is a metal base material and the conductive film pattern 40 can be preferably secured. When the thickness T of the underlying insulating film 30 is equal to or less than the predetermined number of times the surface roughness Ra of the outer bottom surface 24, the surface of the underlying insulating film 30 on a conductive film pattern 40 side tends to be undulated by tracing the streaks 25 of the outer bottom surface 24, and the etching residue 45 of the conductive film is likely to occur along the first direction D1. Therefore, the effect of preventing occurrence of a short-circuit failure due to the etching residue 45 is particularly improved.

Examples of the material of the underlying insulating film 30 illustrated in FIGS. 2 and 4 include silicon oxide, silicon nitride, and alumina, but the material of the underlying insulating film 30 is not particularly limited as long as it is an insulative material. A method of forming the underlying insulating film 30 is not particularly limited, and examples thereof include a sputtering method, a vacuum deposition method, a CVD method, and a sol-gel method. For example, the underlying insulating film 30 can be formed by a formation method with good coverage such as TEOS-CVD method, and it is possible to suitably prevent occurrence of a short-circuit failure in such a case with the sensor according to the present disclosure.

The conductive film pattern 40 illustrated in FIG. 2 connects a first position 24*a* and a second position 24*b*, which are mutually different in an in-plane direction of the outer bottom surface 24 when viewed from the direction perpendicular to the outer bottom surface 24, in a shape in which a length of a conductive path is longer than a length of a straight line connecting the first position 24*a* and the second position 24*b*, which are mutually different positions. By forming the conductive film pattern 40 in such a shape, a long conductive path can be formed in a narrow region, and detection sensitivity by the conductive film pattern 40 can be improved.

The conductive path of the conductive film pattern 40 has a meandering shape having a folded shape (or serpentine) and a narrow and long conductive path can be formed in a narrow region. However, the conductive film pattern 40 is not limited to the meandering shape, and may have another shape (see FIG. 11 and the like) in which the first position 24*a* and the second position 24*b* are connected to each other by bypassing a straight line. The same applies to other embodiments.

As illustrated in FIG. 2, the conductive film pattern 40 includes two electrode film portions 41 and a resistive film portion 42 electrically connecting the two electrode film portions 41. Each of the two electrode film portions 41 is formed to include the first position 24*a* and the second position 24*b* when viewed from the direction perpendicular to the outer bottom surface 24. An external wiring (not illustrated) is connected to the two electrode film portions 41 by wire bonding or the like. The resistive film portion 42 has a rectangular waveform shape or a meandering shape in which the first direction D1 is an amplitude direction, and forms a conductive path narrower than the electrode film portion 41 to electrically connect the two electrode film portions 41.

The conductive film pattern 40 is a pattern based on a film having conductivity, and may be any pattern that forms a conductive path connecting the first position 24*a* and the second position 24*b*. Examples thereof include a single or one type of film, and a plurality of or many types of films. The electrode film portions 41 and the resistive film portion 42 of the conductive film pattern 40 illustrated in FIG. 2 may be films of the same material or films of mutually different materials. Examples of the material of the resistive film portion 42 of the conductive film pattern 40 according to the embodiment include metals such as Cr, Ni, Al, and Cu, and strain resistive film materials including Cr, at least one of Ni, Al, and Cu, and at least one of N and O. Examples of the material of the electrode film portion 41 of the conductive film pattern 40 include good conductor metals such as Al and Au.

In a plan view, the shape of the conductive film pattern 40 illustrated in FIG. 2 is a shape in which each of all straight lines parallel to the first direction D1 passes across a conductive path center line 43 of the conductive film pattern zero times or once but does not pass across the conductive path center line 43 twice or more. In other words, in a plan view, the shape of the conductive film pattern 40 illustrated in FIG. 2 is a shape in which any straight line parallel to the first direction D1 passes across the conductive path center line 43 of the conductive film pattern zero times or once but does not pass across the conductive path center line 43 twice or more. On the other hand, FIG. 13 is a conceptual diagram of a sensor 110 having a conductive film pattern 140 according to a comparative example, and in the conductive film pattern 140 illustrated in FIG. 13, an amplitude direction of the conductive film pattern 140 is perpendicular to the first direction D1.

Figure 13:
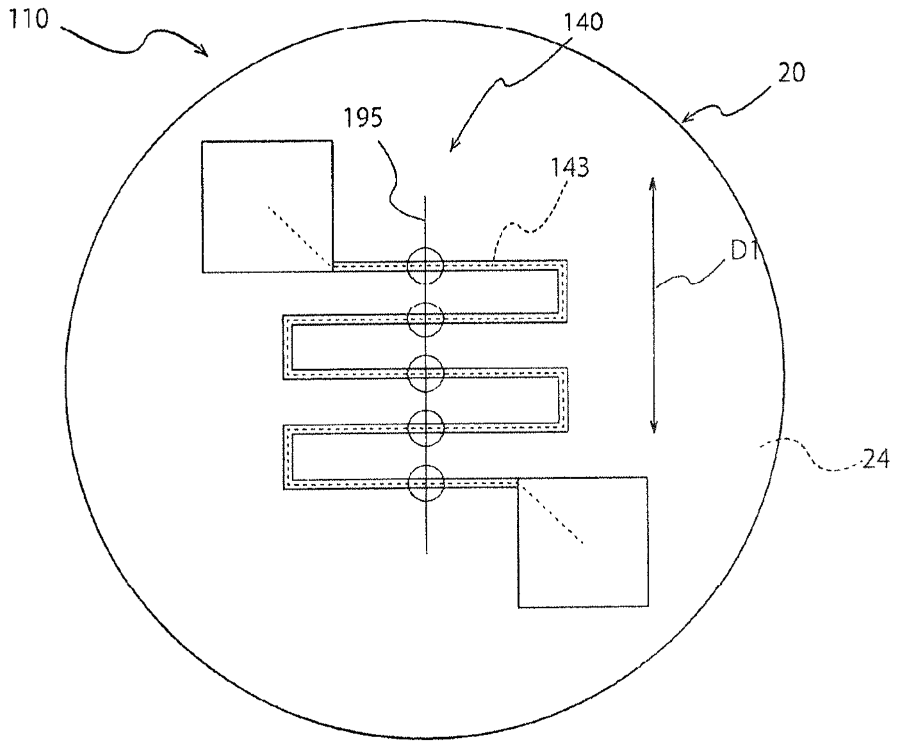
FIG. 13 is an enlarged schematic view of vicinity of a surface of a base material in a sensor according to a comparative example.

In a plan view, the conductive film pattern 140 according to the comparative example illustrated in FIG. 13 has a shape in which a straight line 195 parallel to the first direction D1 passes across a conductive path center line 143 five times as indicated by a circle in FIG. 13. In this manner, the risk of occurrence of a short-circuit failure in the conductive film pattern 140 in which the predetermined straight line 195 parallel to the first direction D1 passes the conductive path center line 143 twice or more is higher than that of the conductive film pattern 40 illustrated in FIG. 2. This is because, as illustrated in FIG. 4, in the conductive film patterns 40 and 140 formed on or above the surface (outer bottom surface 24) on which the streaks 25 are formed, there is a high risk that the etching residue 45 extending in the first direction D1 corresponding to the undulating shape constituting the streaks 25 occurs. That is, a thick portion locally occurs on the streaks 25 at the time of formation of a film serving as the basis of the conductive film patterns 40 and 140, and when the film is removed by etching or the like, the thick portion may remain as the etching residue 45.

In this manner, it is difficult to eliminate the possibility that an etching residue of an elongated conductive material along the first direction D1 as indicated by the straight line 195 in FIG. 13 occurs in the conductive film pattern 140 according to the comparative example, and in a case where an etching residue of a conductive material along the straight line 195 occurs, the etching residue causes a problem of short-circuiting a conductive path of the conductive film pattern 140.

On the other hand, in a plan view, the conductive film pattern 40 illustrated in FIG. 2 has a shape in which each of straight lines parallel to the first direction D1 does not pass across the conductive path center line 43 twice or more. In the sensor 10 having such a conductive film pattern 40, even when an etching residue of a conductive material along the first direction D1 occurs, the etching residue 45 passes across the conductive path only zero times or once, and thus it is possible to prevent a problem that the etching residue 45 forms a short path of the conductive path in the conductive film pattern 40. Moreover, an aspect in which a predetermined straight line parallel to the first direction D1 passes across the conductive path center line 43 of the conductive film pattern once in a plan view includes an aspect in which the predetermined straight line parallel to the first direction D1 intersects the conductive path center line 43 once in the plan view and an aspect in which the predetermined straight line parallel to the first direction D1 continuously overlaps the conductive path center line along the first direction D1 in the plan view.

The sensor 10 illustrated in FIGS. 1 to 4 is manufactured by, for example, the following manufacturing steps. First, in manufacturing the sensor 10, the base material 20 as illustrated in FIGS. 1, 3A, and 3B is prepared. The base material 20 is manufactured by performing machining such as pressing, cutting, and polishing on a predetermined metal material, for example. At this time, the outer bottom surface 24 illustrated in FIGS. 3A and 3B is not mirror-polished, leaving the streaks 25 remaining, which simplifies the manufacturing steps.

Next, the underlying insulating film 30 and the conductive film pattern 40 are formed by forming multiple layers of films serving as the basis of the underlying insulating film 30 and the conductive film pattern 40 on the outer bottom surface 24 of the base material 20 and then performing fine processing on the formed films by a semi-conductor processing technique including etching or the like. Through these steps, the sensor body 18 including the base material 20 as illustrated in FIG. 2 is obtained. Further, the sensor 10 as illustrated in FIG. 1 can be manufactured by fixing the sensor body 18 including the base material 20 to the connecting member 12 or the like as illustrated in FIG. 1 and wiring the substrate 90 and the electrode film portions 41 of the conductive film pattern 40 by wire bonding or the like. An insulating protective layer 35 as illustrated in FIG. 4 may be formed on the conductive film pattern 40. The protective layer 35 is not illustrated in the drawings other than FIG. 4.

As can be understood from comparison with the sensor 110 according to the comparative example illustrated in FIG. 13, in a plan view, the sensor 10 thus obtained has a shape in which each of straight lines parallel to the first direction D1 does not pass across the conductive path center line twice or more. Accordingly, even when the etching residue 45 of the conductive material along the first direction D1 occurs in the manufacturing steps of the sensor 10, the etching residue 45 passes across the conductive path only zero times or once, and thus it is possible to prevent the problem that the etching residue 45 forms a short path in the conductive path of the conductive film pattern 40.

Second Embodiment

Figure 5:
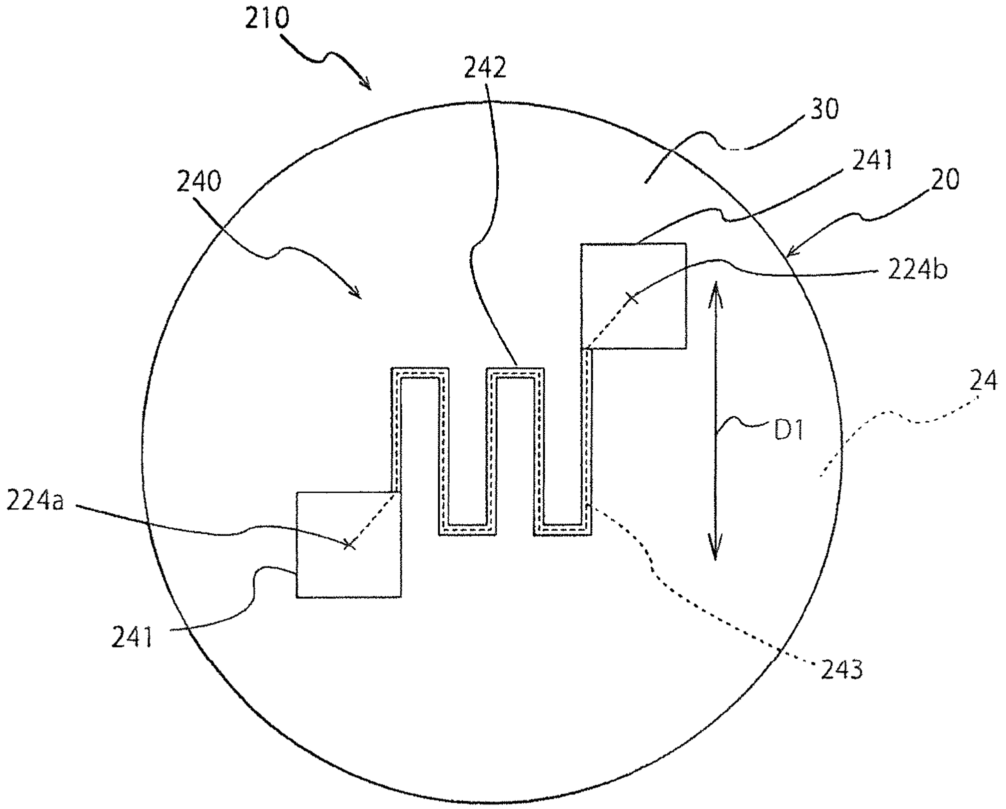
FIG. 5 is an enlarged schematic view of vicinity of a surface of a base material in a sensor according to a second embodiment.

FIG. 5 is an enlarged schematic plan view of a sensor body of a sensor 210 according to a second embodiment as viewed from an outer bottom surface 24 side of the bottom wall 22 of the base material 20. The sensor 210 according to the second embodiment is similar to the sensor 10 according to the first embodiment except that a shape of a conductive film pattern 240 is different. Description of the sensor 210 according to the second embodiment will be focused on differences from the sensor 10, and description of common points with the sensor 10 will be omitted.

Similarly to the conductive film pattern 40 illustrated in FIG. 2, the conductive film pattern 240 of the sensor 210 illustrated in FIG. 5 is formed in an in-plane direction (see FIG. 1) of the outer bottom surface 24 of the base material 20 with the underlying insulating film 30 interposed therebetween. The conductive film pattern 240 connects a first position **224*a* and a second position 224*b*, which are mutually different positions in the in-plane direction of the outer bottom surface 24, in a shape in which a length of a conductive path is longer than a length of a straight line connecting the first position 24*a* and the second position 24*b*. In the conductive film pattern 40 illustrated in FIG. 2, a straight line connecting the first position 24*a* and the second position 24*b* is perpendicular to the first direction D1, but in the conductive film pattern 240, a straight line connecting the first position 224*a* and the second position 224*b*** is in an oblique direction with respect to the first direction D1.

The conductive film pattern 240 includes two electrode film portions 241 and a resistive film portion 242 electrically connecting the two electrode film portions 241. Each of the two electrode film portions 241 is formed to include the first position **224*a* and the second position 224*b* when viewed from a direction perpendicular to the outer bottom surface 24. The resistive film portion 242 has a rectangular waveform shape or a meandering shape in which the first direction D1 is an amplitude direction, and forms a conductive path narrower than the electrode film portion 241 to electrically connect the two electrode film portions 241**.

Similarly to the conductive film pattern 40 illustrated in FIG. 2, in a plan view, the shape of the conductive film pattern 240 illustrated in FIG. 5 is a shape in which each of straight lines parallel to the first direction D1 passes across a conductive path center line 243 of the conductive film pattern 240 zero times or once but does not pass across the conductive path center line 243 twice or more. The sensor 210 having the conductive film pattern 240 also exerts the same effect as the sensor 10 according to the first embodiment.

As can be understood from comparison between FIG. 2 and FIG. 5, the shapes of the conductive film patterns 40 and 240 are not particularly limited, and various shapes in which the first positions **24*a* and 224*a* and the second positions 24*b* and 224*b* are connected in a shape longer than a straight line can be adopted. In addition, the first positions 24*a* and 224*a* and the second positions 24*b* and 224*b* at which the conductive film patterns 40 and 240 form conductive paths may be any mutually different positions in the in-plane direction of the outer bottom surface 24**.

Third Embodiment

Figure 6:
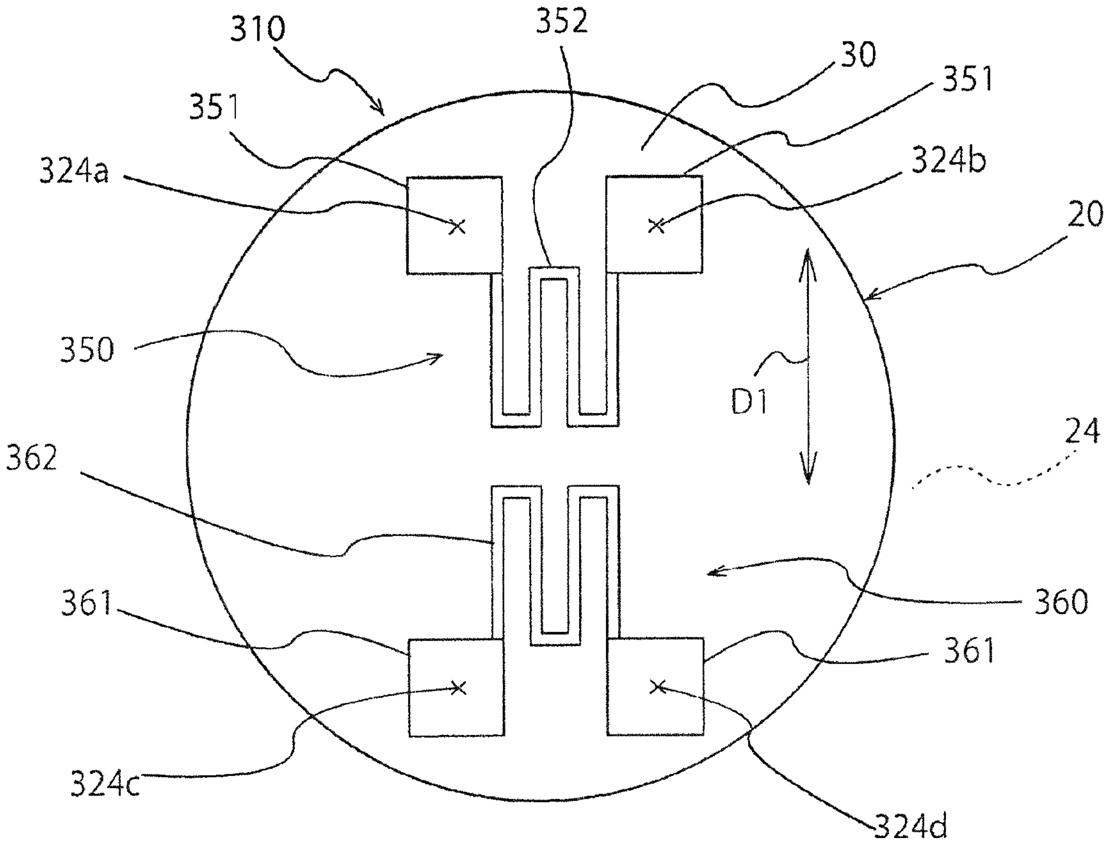
FIG. 6 is an enlarged schematic view of vicinity of a surface of a base material in a sensor according to a third embodiment.

FIG. 6 is an enlarged schematic plan view of a sensor body of a sensor 310 according to a third embodiment as viewed from an outer bottom surface 24 side of the bottom wall 22 of the base material 20. The sensor 310 according to the third embodiment is similar to the sensor 10 according to the first embodiment except that the sensor 310 has a plurality of conductive film patterns including a first conductive film pattern 350 and a second conductive film pattern 360. Description of the sensor 310 according to the third embodiment will be focused on differences from the sensor 10, and description of common points with the sensor 10 will be omitted.

Similarly to the conductive film pattern 40 illustrated in FIG. 2, each of the first conductive film pattern 350 and the second conductive film pattern 360 of the sensor 310 illustrated in FIG. 6 is formed on the outer bottom surface 24 (see FIG. 1) of the base material 20 with the underlying insulating film 30 interposed therebetween. The first conductive film pattern 350 connects a first position **324*a* and a second position 324*b*, which are mutually different positions in an in-plane direction of the outer bottom surface 24, in a first shape in which a length of a conductive path is longer than a length of a straight line connecting the first position 324*a* and the second position 324*b*. The second conductive film pattern 360 connects a third position 324*c* and a fourth position 324*d*, which are mutually different positions in the in-plane direction of the outer bottom surface 24, in a second shape in which a length of a conductive path is longer than a length of a straight line connecting the third position 324***c* and the fourth position 324*d*.

The first conductive film pattern 350 and the second conductive film pattern 360 are formed at shifted positions so as not to overlap each other when viewed from a direction perpendicular to the outer bottom surface 24. The first conductive film pattern 350 includes two electrode film portions 351 and a resistive film portion 352 electrically connecting the two electrode film portions 351. The second conductive film pattern 360 includes two electrode film portions 361 and a resistive film portion 362 electrically connecting the two electrode film portions 361. The resistive film portion 352 of the conductive film pattern 350 has a rectangular waveform shape or a meandering shape in which the first direction D1 is an amplitude direction, and forms a conductive path narrower than the electrode film portion 351 to electrically connect the two electrode film portions 351. The resistive film portion 362 of the conductive film pattern 360 has a rectangular waveform shape or a meandering shape in which the first direction D1 is an amplitude direction, and forms a conductive path narrower than the electrode film portion 361 to electrically connect the two electrode film portions 361. The sensor 310 can calculate a pressure of a fluid, which is a detection target, using both a detection signal from the first conductive film pattern 350 and a detection signal from the second conductive film pattern 360.

Similarly to the conductive film pattern 40 illustrated in FIG. 2, in a plan view, each of the first and second shapes of the first and second conductive film patterns 350 and 360 illustrated in FIG. 6 is a shape in which each of straight lines parallel to the first direction D1 passes across a conductive path center line of the conductive film pattern (center line of conductive path connecting two different positions (see FIG. 2, FIG. 5, and the like)) zero times or once but does not pass across the conductive path center line twice or more. The sensor 310 having the first and second conductive film patterns 350 and 360 also exerts the same effects as the sensor 10 according to the first embodiment in terms of the common points with the sensor 10.

Fourth Embodiment

Figure 7:
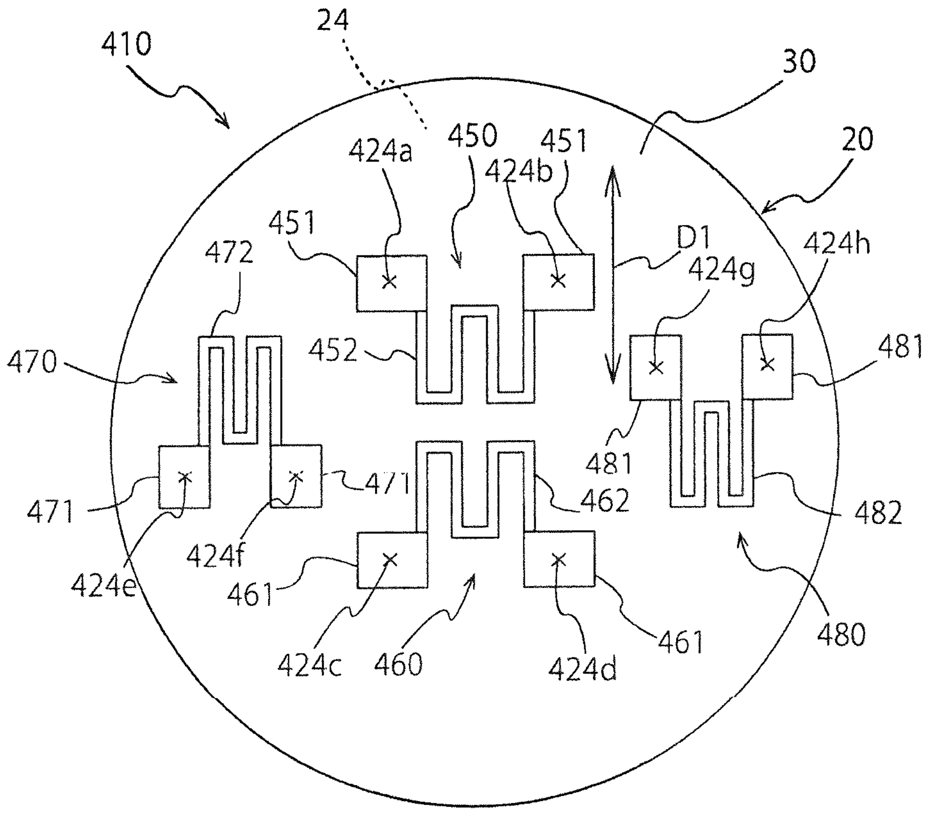
FIG. 7 is an enlarged schematic view of vicinity of a surface of a base material in a sensor according to a fourth embodiment.

FIG. 7 is an enlarged schematic plan view of a sensor body of a sensor 410 according to a fourth embodiment as viewed from an outer bottom surface 24 side of the bottom wall 22 of the base material 20. The sensor 410 according to the fourth embodiment is similar to the sensor 10 according to the first embodiment except that the sensor 410 has a plurality of (four) conductive film patterns including a first conductive film pattern 450, a second conductive film pattern 460, a third conductive film pattern 470, and a fourth conductive film pattern 480. Description of the sensor 410 according to the fourth embodiment will be focused on differences from the sensor 10, and description of common points with the sensor 10 will be omitted.

Similar to the conductive film pattern 40 illustrated in FIG. 2, each of the first to fourth conductive film patterns 450, 460, 470, and 480 of the sensor 410 illustrated in FIG. 7 is formed on the outer bottom surface 24 (see FIG. 1) of the base material 20 with the underlying insulating film 30 interposed therebetween. The first conductive film pattern 450 connects a first position 424*a* and a second position 424*b*, which are mutually different positions in an in-plane direction of the outer bottom surface 24, in a first shape in which a length of a conductive path is longer than a length of a straight line connecting the first position 424*a* and the second position 424*b*. The second conductive film pattern 460 connects a third position 424*c* and a fourth position 424*d*, which are mutually different positions in the in-plane direction of the outer bottom surface 24, in a second shape in which a length of a conductive path is longer than a length of a straight line connecting the third position 424*c* and the fourth position 424*d*.

The third conductive film pattern 470 illustrated in FIG. 7 connects a fifth position 424*e* and a sixth position 424*f*, which are mutually different positions in the in-plane direction of the outer bottom surface 24, in a third shape in which a length of a conductive path is longer than a length of a straight line connecting the fifth position 424*e* and the sixth position 424*f*. The fourth conductive film pattern 480 connects a seventh position 424*g* and an eighth position 424*h*, which are mutually different positions in the in-plane direction of the outer bottom surface 24, in a fourth shape in which a length of a conductive path is longer than a length of a straight line connecting the seventh position 424*g* and the eighth position 424*h*.

The first to fourth conductive film patterns 450, 460, 470, and 480 are formed at shifted positions so as not to overlap one another when viewed from a direction perpendicular to the outer bottom surface 24. The first conductive film pattern 450 includes two electrode film portions 451 and a resistive film portion 452 electrically connecting the two electrode film portions 451. The second conductive film pattern 460 includes two electrode film portions 461 and a resistive film portion 462 electrically connecting the two electrode film portions 461. The third conductive film pattern 470 includes two electrode film portions 471 and a resistive film portion 472 electrically connecting the two electrode film portions 471. The fourth conductive film pattern 480 includes two electrode film portions 481 and a resistive film portion 482 electrically connecting the two electrode film portions 481. The resistive film portion 452 of the first conductive film pattern 450 has a rectangular waveform shape or a meandering shape in which the first direction D1 is an amplitude direction, and forms a conductive path narrower than the electrode film portion 451 to electrically connect the two electrode film portions 451. The resistive film portion 462 of the second conductive film pattern 460 has a rectangular waveform shape or a meandering shape in which the first direction D1 is the amplitude direction, and forms a conductive path narrower than the electrode film portion 461 to electrically connect the two electrode film portions 461. The resistive film portion 472 of the third conductive film pattern 470 has a rectangular waveform shape or a meandering shape in which the first direction D1 is the amplitude direction, and forms a conductive path narrower than the electrode film portion 471 to electrically connect the two electrode film portions 471. The resistive film portion 482 of the fourth conductive film pattern 480 has a rectangular waveform shape or a meandering shape in which the first direction D1 is the amplitude direction, and forms a conductive path narrower than the electrode film portion 481 to electrically connect the two electrode film portions 481. The sensor 410 forms, for example, a bridge circuit using detection signals from the first to fourth conductive film patterns 450, 460, 470, and 480, and can accurately calculate a pressure of a fluid, which is a detection target.

Similarly to the conductive film pattern 40 illustrated in FIG. 2, in a plan view, each of the first to fourth shapes of the first to fourth conductive film patterns 450, 460, 470, and 480 illustrated in FIG. 7 is a shape in which each of straight lines parallel to the first direction D1 passes across a conductive path center line (center line of conductive path connecting two different positions (see FIGS. 2, 5, and the like)) of the conductive film pattern zero times or once but does not pass across the conductive path center line twice or more. The sensor 410 having the first to fourth conductive film patterns 450, 460, 470, and 480 also exerts the same effects as the sensor 10 according to the first embodiment in terms of the common points with the sensor 10.

Fifth Embodiment

Figure 8:
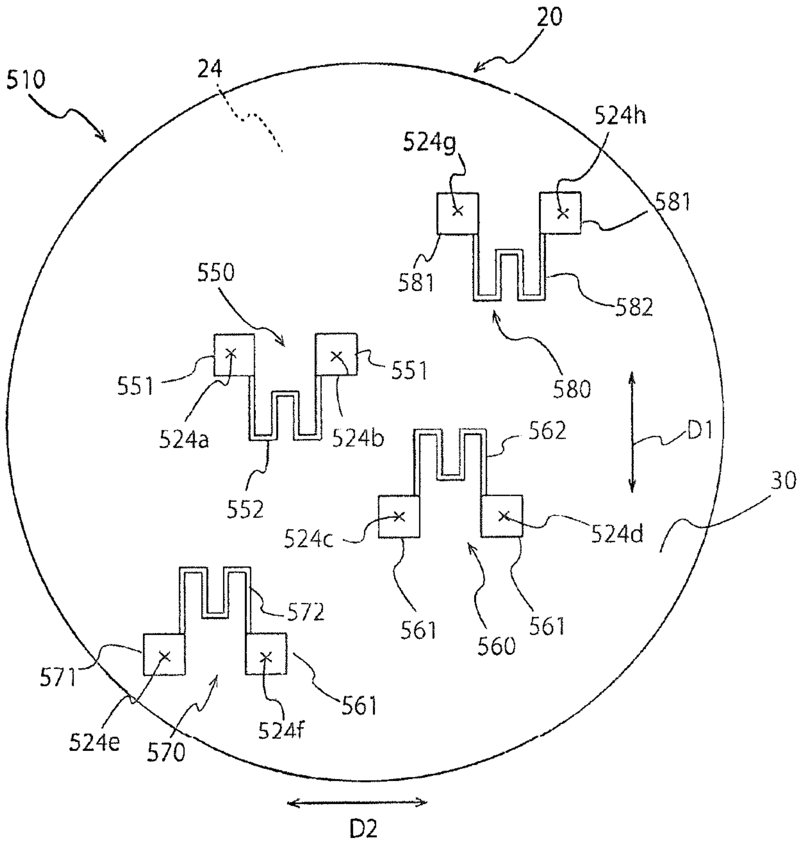
FIG. 8 is an enlarged schematic view of vicinity of a surface of a base material in a sensor according to a fifth embodiment.

FIG. 8 is an enlarged schematic plan view of a sensor body of a sensor 510 according to a fifth embodiment as viewed from an outer bottom surface 24 side of the bottom wall 22 of the base material 20. The sensor 510 according to the fifth embodiment is similar to the sensor 410 according to the fourth embodiment except that an arrangement of a plurality of (four) conductive film patterns including a first conductive film pattern 550, a second conductive film pattern 560, a third conductive film pattern 570, and a fourth conductive film pattern 580 is different. Description of the sensor 510 according to the fifth embodiment will be focused on differences from the sensor 410, and description of common points with the sensor 410 will be omitted.

Similar to the conductive film pattern 40 illustrated in FIG. 2, each of the first to fourth conductive film patterns 550, 560, 570, and 580 of the sensor 510 illustrated in FIG. 8 is formed on the outer bottom surface 24 (see FIG. 1) of the base material 20 with the underlying insulating film 30 interposed therebetween. The first conductive film pattern 550 connects a first position 524*a* and a second position 524*b*, which are mutually different positions in an in-plane direction of the outer bottom surface 24, in a first shape in which a length of a conductive path is longer than a length of a straight line connecting the first position 524*a* and the second position 524*b*. The second conductive film pattern 560 connects a third position 524*c* and a fourth position 524*d*, which are mutually different positions in the in-plane direction of the outer bottom surface 24, in a second shape in which a length of a conductive path is longer than a length of a straight line connecting the third position 524*c* and the fourth position 524*d*.

The third conductive film pattern 570 illustrated in FIG. 8 connects a fifth position 524*e* and a sixth position 524*f*, which are mutually different positions in the in-plane direction of the outer bottom surface 24, in a third shape in which a length of a conductive path is longer than a length of a straight line connecting the fifth position 524*e* and the sixth position 524*f*. The fourth conductive film pattern 580 connects a seventh position 524*g* and an eighth position 524*h*, which are mutually different positions in the in-plane direction of the outer bottom surface 24, in a fourth shape in which a length of a conductive path is longer than a length of a straight line connecting the seventh position 524*g* and the eighth position 524*h*.

The first to fourth conductive film patterns 550, 560, 570, and 580 are formed at shifted positions so as not to overlap one another when viewed from a direction perpendicular to the outer bottom surface 24. The first conductive film pattern 550 includes two electrode film portions 551 and a resistive film portion 552 electrically connecting the two electrode film portions 551. The second conductive film pattern 560 includes two electrode film portions 561 and a resistive film portion 562 electrically connecting the two electrode film portions 561. The third conductive film pattern 570 includes two electrode film portions 571 and a resistive film portion 572 electrically connecting the two electrode film portions 571. The fourth conductive film pattern 580 includes two electrode film portions 581 and a resistive film portion 582 electrically connecting the two electrode film portions 581. The resistive film portion 552 of the first conductive film pattern 550 has a rectangular waveform shape or a meandering shape in which the first direction D1 is an amplitude direction, and forms a conductive path narrower than the electrode film portion 551 to electrically connect the two electrode film portions 551. The resistive film portion 562 of the second conductive film pattern 560 has a rectangular waveform shape or a meandering shape in which the first direction D1 is the amplitude direction, and forms a conductive path narrower than the electrode film portion 561 to electrically connect the two electrode film portions 561. The resistive film portion 572 of the third conductive film pattern 570 has a rectangular waveform shape or a meandering shape in which the first direction D1 is the amplitude direction, and forms a conductive path narrower than the electrode film portion 571 to electrically connect the two electrode film portions 571. The resistive film portion 582 of the fourth conductive film pattern 580 has a rectangular waveform shape or a meandering shape in which the first direction D1 is the amplitude direction, and forms a conductive path narrower than the electrode film portion 581 to electrically connect the two electrode film portions 581. The sensor 510 forms, for example, a bridge circuit using detection signals from the first to fourth conductive film patterns 550, 560, 570, and 580, and can accurately calculate a pressure of a fluid, which is a detection target.

Similarly to the conductive film pattern 40 illustrated in FIG. 2, in a plan view, each of the first to fourth shapes of the first to fourth conductive film patterns 550, 560, 570, and 580 illustrated in FIG. 8 is a shape in which each of straight lines parallel to the first direction D1 passes across a conductive path center line (center line of conductive path connecting two mutually different positions (see FIGS. 2, 5, and the like)) of the conductive film pattern zero times or once but does not pass across the conductive path center line twice or more. In the sensor 510 illustrated in FIG. 8, the first conductive film pattern 550 and the second conductive film pattern 560 having a short center-to-center distance along the first direction D1 are arranged at shifted positions in the second direction D2 so as not to overlap each other when viewed from the first direction D1.

Accordingly, in the sensor 510 illustrated in FIG. 8, in a plan view, a straight line parallel to the first direction D1 passes across the first conductive film pattern 550 and does not pass across the second conductive film pattern 560, passes across the second conductive film pattern 560 and does not pass across the first conductive film pattern 550, or passes across neither the first conductive film pattern 550 nor the second conductive film pattern 560, and does not pass across both the first conductive film pattern 550 and the second conductive film pattern 560. In other words, in the sensor 510 illustrated in FIG. 8, in a plan view, any straight line parallel to the first direction D1 passes across the first conductive film pattern 550 and does not pass across the second conductive film pattern 560, passes across the second conductive film pattern 560 and does not pass across the first conductive film pattern 550, or passes across neither the first conductive film pattern 550 nor the second conductive film pattern 560, but does not pass across both the first conductive film pattern 550 and the second conductive film pattern 560. According to such a sensor 10, it is possible to prevent formation of a short path caused by the etching residue 45 (see FIG. 4) of a conductive film between the conductive film patterns 550 and 560 which are different, and to suitably prevent occurrence of a short-circuit failure between the conductive film patterns 550 and 560 which are different.

The center-to-center distance along the first direction D1 between the first conductive film pattern 550 and the second conductive film pattern 560 is shorter than a center-to-center distance along the first direction D1 between the first conductive film pattern 550 and each of the third conductive film pattern 570 and the fourth conductive film pattern 580 and than a center-to-center distance along the first direction D1 between the second conductive film pattern 560 and each of the third conductive film pattern 570 and the fourth conductive film pattern 580. According to such a sensor 510, it is possible to prevent formation of a short path caused by the etching residue 45 of a conductive film between the first conductive film pattern 550 and the second conductive film pattern 560 in which the center-to-center distance along the first direction D1 is short, and thus it is possible to prevent an increase in size of the sensor while preventing occurrence of a short-circuit failure. Although the first conductive film pattern 550 and the third conductive film pattern 570 overlap each other when viewed from the first direction D1, the center-to-center distance along the first direction D1 is relatively large, and thus the risk of occurrence of a short-circuit failure is relatively small.

The sensor 510 having the first to fourth conductive film patterns 550, 560, 570, and 580 also exerts the same effect as the sensor 410 according to the fourth embodiment in terms of the common points with the sensor 410.

Sixth Embodiment

Figure 9:
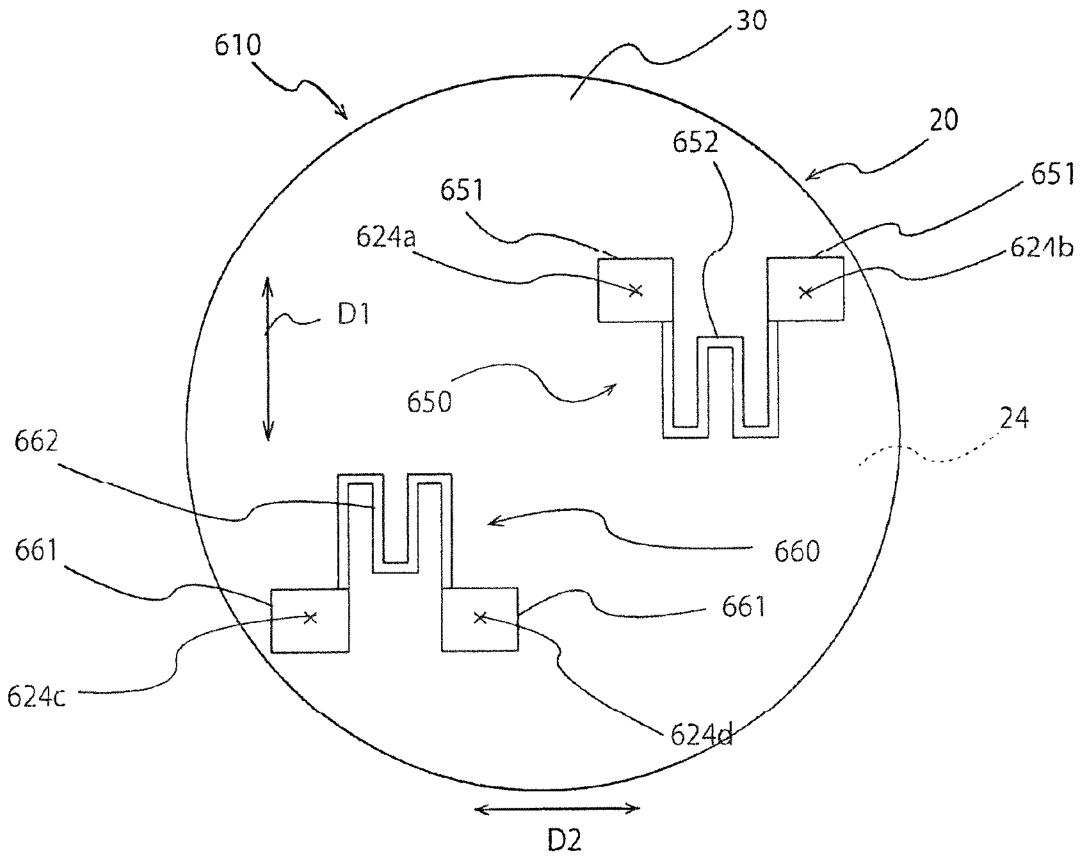
FIG. 9 is an enlarged schematic view of vicinity of a surface of a base material in a sensor according to a sixth embodiment.

FIG. 9 is an enlarged schematic diagram of a sensor body of a sensor 610 according to a sixth embodiment as viewed from an outer bottom surface 24 side of the bottom wall 22 of the base material 20. The sensor 610 according to the sixth embodiment is similar to the sensor 310 according to the third embodiment except that an arrangement of a plurality of conductive film patterns including a first conductive film pattern 650 and a second conductive film pattern 660 is different. Description of the sensor 610 according to the sixth embodiment will be focused on differences from the sensor 310, and description of common points with the sensor 310 will be omitted.

Similarly to the conductive film pattern 40 illustrated in FIG. 2, each of the first conductive film pattern 650 and the second conductive film pattern 660 of the sensor 610 illustrated in FIG. 9 is formed on the outer bottom surface 24 (see FIG. 1) of the base material 20 with the underlying insulating film 30 interposed therebetween. The first conductive film pattern 650 connects a first position 624*a* and a second position 624*b*, which are mutually different positions in an in-plane direction of the outer bottom surface 24, in a first shape in which a length of a conductive path is longer than a length of a straight line connecting the first position 624*a* and the second position 624*b*. The second conductive film pattern 660 connects a third position 624*c* and a fourth position 624*d*, which are mutually different positions in the in-plane direction of the outer bottom surface 24, in a second shape in which a length of a conductive path is longer than a length of a straight line connecting the third position 624*c* and the fourth position 624*d*.

The first conductive film pattern 650 and the second conductive film pattern 660 are formed at shifted positions so as not to overlap each other when viewed from a direction perpendicular to the outer bottom surface 24. The first conductive film pattern 650 includes two electrode film portions 651 and a resistive film portion 652 electrically connecting the two electrode film portions 651. The second conductive film pattern 660 includes two electrode film portions 661 and a resistive film portion 662 electrically connecting the two electrode film portions 661. The resistive film portion 652 of the first conductive film pattern 650 has a rectangular wave shape or a meandering shape in which the first direction D1 is an amplitude direction, and forms a conductive path having a width narrower than that of the electrode film portion 651 to electrically connect the two electrode film portions 651. The resistive film portion 662 of the second conductive film pattern 660 has a rectangular waveform shape or a meandering shape in which the first direction D1 is the amplitude direction, and forms a conductive path narrower than the electrode film portion 661 to electrically connect the two electrode film portions 661. The sensor 610 can calculate a pressure of a fluid, which is a detection target, using both a detection signal from the first conductive film pattern 650 and a detection signal from the second conductive film pattern 660.

Similarly to the conductive film pattern 40 illustrated in FIG. 2, in a plan view, each of the first and second shapes of the first and second conductive film patterns 650 and 660 illustrated in FIG. 9 is a shape in which each of straight lines parallel to the first direction D1 passes across a conductive path center line of the conductive film pattern (center line of conductive path connecting two different positions (see FIGS. 2, 5, and the like)) zero times or once, but does not pass across the conductive path center line twice or more. Further, the first conductive film pattern 650 and the second conductive film pattern 660 of the sensor 610 illustrated in FIG. 9 are arranged at shifted positions in the second direction D2 so as not to overlap each other when viewed from the first direction D1, unlike the first and second conductive film patterns 350 and 360 illustrated in FIG. 6.

Accordingly, in the sensor 610 illustrated in FIG. 9, in a plan view, a straight line parallel to the first direction D1 passes across any one of the conductive film patterns 650 and 660 or passes across none of the conductive film patterns 650 and 660, and does not pass across two or more of the conductive film patterns 650 and 660. According to such a sensor 610, even when two or more conductive film patterns 650 and 660 are provided, it is possible to prevent a problem that a short path caused by the etching residue 45 of a conductive film is formed between the conductive film patterns 650 and 660 which are different, and it is possible to suitably prevent occurrence of a short-circuit failure between the conductive film patterns 650 and 660 which are different.

In the sensor 310 illustrated in FIG. 6, the two conductive film patterns 350 and 360 overlap each other when viewed from the first direction D1. Therefore, a short path caused by the etching residue 45 of the conductive film may be formed between the two conductive film patterns 350 and 360. However, when a short path is formed by the two conductive film patterns 350 and 360, the short path can be relatively easily found by energization check between one of the two electrode film portions 351 and one of the two electrode film portions 361, and thus the effect of the sensor 310 which prevents formation of a short path in the respective conductive film patterns 350 and 360 is large.

The sensor 610 having the first and second conductive film patterns 650 and 660 also exerts the same effect as the sensor 310 according to the third embodiment in terms of the common points with the sensor 310.

Seventh Embodiment

Figure 10:
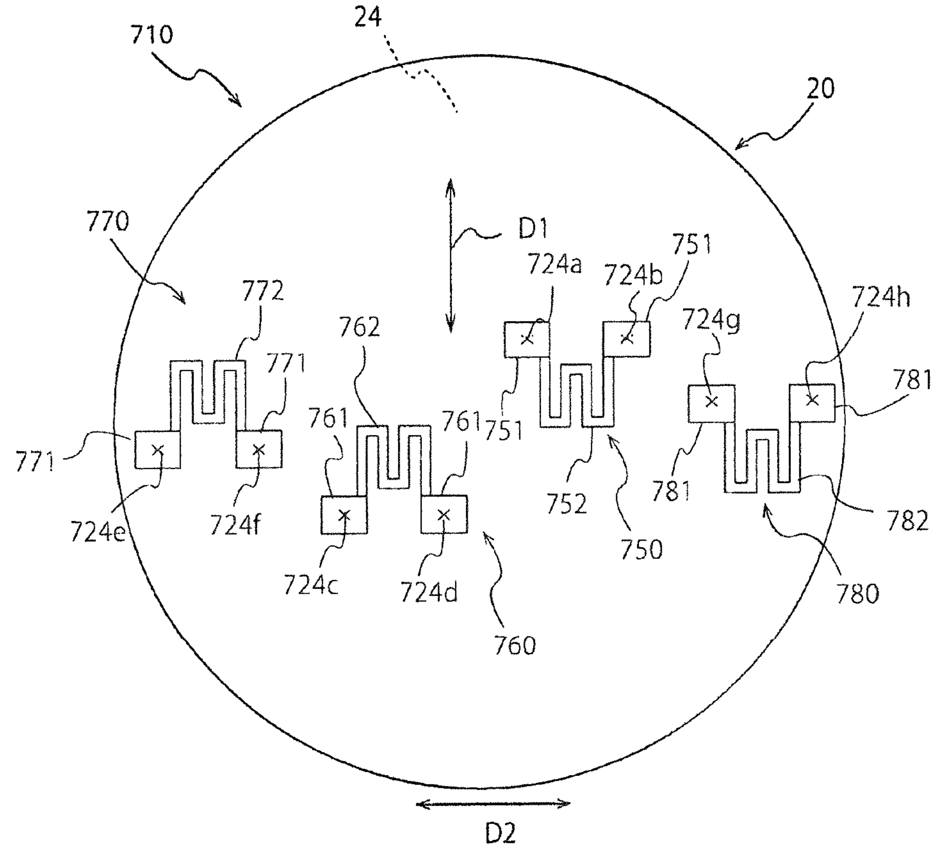
FIG. 10 is an enlarged schematic view of vicinity of a surface of a base material in a sensor according to a seventh embodiment.

FIG. 10 is an enlarged schematic diagram of a sensor body of a sensor 710 according to a seventh embodiment as viewed from an outer bottom surface 24 side of the bottom wall 22 of the base material 20. The sensor 710 according to the seventh embodiment is similar to the sensor 510 according to the fifth embodiment except that an arrangement of a plurality of (four) conductive film patterns including a first conductive film pattern 750, a second conductive film pattern 760, a third conductive film pattern 770, and a fourth conductive film pattern 780 is different. Description of the sensor 710 according to the seventh embodiment will be focused on differences from the sensor 510, and description of common points with the sensor 510 will be omitted.

Similar to the conductive film pattern 40 illustrated in FIG. 2, each of the first to fourth conductive film patterns 750, 760, 770, and 780 of the sensor 710 illustrated in FIG. 10 is formed on the outer bottom surface 24 (see FIG. 1) of the base material 20 with the underlying insulating film 30 interposed therebetween. The first conductive film pattern 750 connects a first position 724*a* and a second position 724*b*, which are mutually different positions in an in-plane direction of the outer bottom surface 24, in a first shape in which a length of a conductive path is longer than a length of a straight line connecting the first position 724*a* and the second position 724*b*. The second conductive film pattern 760 connects a third position 724*c* and a fourth position 724*d*, which are mutually different positions in the in-plane direction of the outer bottom surface 24, in a second shape in which a length of a conductive path is longer than a length of a straight line connecting the third position 724*c* and the fourth position 724*d*.

The third conductive film pattern 770 illustrated in FIG. 10 connects a fifth position 724*e* and a sixth position 724*f*, which are mutually different positions in the in-plane direction of the outer bottom surface 24, in a third shape in which a length of a conductive path is longer than a length of a straight line connecting the fifth position 724*e* and the sixth position 724*f*. The fourth conductive film pattern 780 connects a seventh position 724*g* and an eighth position 724*h*, which are mutually different positions in the in-plane direction of the outer bottom surface 24, in a fourth shape in which a length of a conductive path is longer than a length of a straight line connecting the seventh position 724*g* and the eighth position 724*h*.

The first to fourth conductive film patterns 750, 760, 770, and 780 are formed at shifted positions so as not to overlap one another when viewed from a direction perpendicular to the outer bottom surface 24. The first conductive film pattern 750 includes two electrode film portions 751 and a resistive film portion 752 electrically connecting the two electrode film portions 751. The second conductive film pattern 760 includes two electrode film portions 761 and a resistive film portion 762 electrically connecting the two electrode film portions 761. The third conductive film pattern 770 includes two electrode film portions 771 and a resistive film portion 772 electrically connecting the two electrode film portions 771. The fourth conductive film pattern 780 includes two electrode film portions 781 and a resistive film portion 782 electrically connecting the two electrode film portions 781. The resistive film portion 752 of the first conductive film pattern 750 has a rectangular waveform shape or a meandering shape in which the first direction D1 is an amplitude direction, and forms a conductive path narrower than the electrode film portion 751 to electrically connect the two electrode film portions 751. The resistive film portion 762 of the second conductive film pattern 760 has a rectangular waveform shape or a meandering shape in which the first direction D1 is the amplitude direction, and forms a conductive path narrower than the electrode film portion 761 to electrically connect the two electrode film portions 761. The resistive film portion 772 of the third conductive film pattern 770 has a rectangular waveform shape or a meandering shape in which the first direction D1 is the amplitude direction, and forms a conductive path narrower than the electrode film portion 771 to electrically connect the two electrode film portions 771. The resistive film portion 782 of the fourth conductive film pattern 780 has a rectangular waveform shape or a meandering shape in which the first direction D1 is the amplitude direction, and forms a conductive path narrower than the electrode film portion 781 to electrically connect the two electrode film portions 781. The sensor 710 forms, for example, a bridge circuit using detection signals from the first to fourth conductive film patterns 750, 760, 770, and 780, and can accurately calculate a pressure of a fluid, which is a detection target.

Similarly to the conductive film pattern 40 illustrated in FIG. 2, in a plan view, each of the first to fourth shapes of the first to fourth conductive film patterns 750, 760, 770, and 780 illustrated in FIG. 10 is a shape in which each of straight lines parallel to the first direction D1 passes across a conductive path center line (center line of conductive path connecting two different positions (see FIGS. 2, 5, and the like)) of the conductive film pattern zero times or once but does not pass across the conductive path center line twice or more. In the sensor 710 illustrated in FIG. 10, the first to fourth conductive film patterns 750, 760, 770, and 780 are arranged at shifted positions in the second direction D2 so as not to overlap one another when viewed from the first direction D1.

Accordingly, in the sensor 710 illustrated in FIG. 10, in a plan view, a straight line parallel to the first direction D1 passes across any one of the conductive film patterns 750, 760, 770, and 780 or passes across none of the conductive film patterns 750, 760, 770, and 780, and does not pass across two or more of the conductive film patterns 750, 760, 770, and 780. According to such a sensor 710, even when two or more conductive film patterns 750, 760, 770, and 780 are provided, it is possible to prevent a problem that a short path caused by the etching residue 45 of a conductive film is formed among the conductive film patterns 750, 760, 770, and 780 which are different, and it is possible to suitably prevent occurrence of a short-circuit failure among the conductive film patterns 750, 760, 770, and 780 which are different.

The sensor 710 having the first to fourth conductive film patterns 750, 760, 770, and 780 also exerts the same effect as the sensor 510 according to the fifth embodiment in terms of the common points with the sensor 510.

Eighth Embodiment

Figure 11:
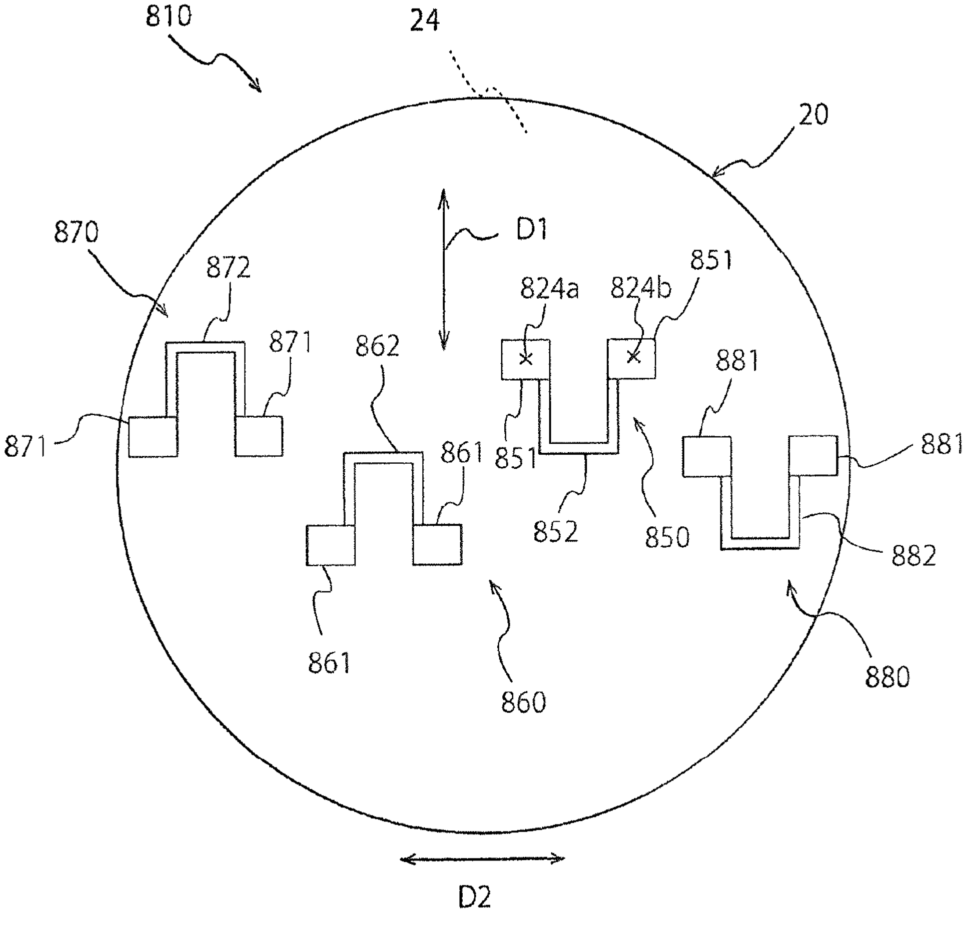
FIG. 11 is an enlarged schematic view of vicinity of a surface of a base material in a sensor according to an eighth embodiment.

FIG. 11 is an enlarged schematic diagram of a sensor body of a sensor 810 according to an eighth embodiment as viewed from an outer bottom surface 24 side of the bottom wall 22 of the base material 20. The sensor 810 according to the eighth embodiment is similar to the sensor 710 according to the seventh embodiment except that shapes of a plurality of (four) conductive film patterns including a first conductive film pattern 850, a second conductive film pattern 860, a third conductive film pattern 870, and a fourth conductive film pattern 880 are different. Description of the sensor 810 according to the eighth embodiment will be focused on differences from the sensor 710, and description of common points with the sensor 710 will be omitted.

Similar to the conductive film pattern 40 illustrated in FIG. 2, each of the first to fourth conductive film patterns 850, 860, 870, and 880 of the sensor 810 illustrated in FIG. 11 is formed on the outer bottom surface 24 (see FIG. 1) of the base material 20 with the underlying insulating film 30 interposed therebetween. Similarly to the first conductive film pattern 750 illustrated in FIG. 10, the first conductive film pattern 850 connects a first position 824*a* and a second position 824*b*, which are mutually different positions in an in-plane direction of the outer bottom surface 24, in a first shape in which a length of a conductive path is longer than a length of a straight line connecting the first position 824*a* and the second position 824*b*. The same applies to a second shape of the second conductive film pattern 860, a third shape of the third conductive film pattern 870, and a fourth shape of the fourth conductive film pattern 880.

The first conductive film pattern 850 includes two electrode film portions 851 and a resistive film portion 852 electrically connecting the two electrode film portions 851. The second conductive film pattern 860 includes two electrode film portions 861 and a resistive film portion 862 electrically connecting the two electrode film portions 861. The third conductive film pattern 870 includes two electrode film portions 871 and a resistive film portion 872 electrically connecting the two electrode film portions 871. The fourth conductive film pattern 880 includes two electrode film portions 881 and a resistive film portion 882 electrically connecting the two electrode film portions 881. Each of the resistive film portions 852, 862, 872, and 882 of the respective conductive film patterns 850, 860, 870, and 880 has a U-shape in which an interrupted portion faces the first direction D1. Such conductive film patterns 850, 860, 870, and 880 do not form a conductive path that is as long as the conductive film patterns 750, 760, 770, and 780 having a meandering shape illustrated in FIG. 10, but have a folded shape similar to the conductive film patterns 750, 760, 770, and 780, and such conductive film patterns 850, 860, 870, and 880 may be appropriate depending on required performance of the sensor 810.

Similarly to the conductive film pattern 40 illustrated in FIG. 2, in a plan view, each of the first to fourth shapes of the first to fourth conductive film patterns 850, 860, 870, and 880 illustrated in FIG. 11 is a shape in which each of straight lines parallel to the first direction D1 passes across a conductive path center line of the conductive film pattern (center line of conductive path connecting two different positions (see FIGS. 2, 5, and the like)) zero times or once, but does not pass across the conductive path center line twice or more.

The sensor 810 having the first to fourth conductive film patterns 850, 860, 870, and 880 also exerts the same effect as the sensor 710 according to the seventh embodiment in terms of the common points with the sensor 710.

Ninth Embodiment

FIG. 12 is an enlarged schematic diagram of a sensor body of a sensor 910 according to a ninth embodiment as viewed from a surface 924 side of a base material 920. Similar to the outer bottom surface 24 of the base material 20 illustrated in FIGS. 3A and 3B, streaks are formed on or above the surface 924 of the base material 920 along the first direction D1 in a plan view viewed from a direction perpendicular to the surface 924. The sensor 910 according to the ninth embodiment is the same as the sensor 10 according to the first embodiment except that the sensor 910 is a strain gauge. Description of the sensor 910 according to the ninth embodiment will be focused on differences from the sensor 10, and description of common points with the sensor 10 will be omitted.

The sensor 910 has a conductive film pattern 940, and the conductive film pattern 940 connects a first position 924*a* and a second position 924*b*, which are mutually different positions in an in-plane direction of the surface 924, in a shape in which a length of a conductive path is longer than a length of a straight line connecting the first position 924*a* and the second position 924*b*.

The conductive film pattern 940 includes two electrode film portions 941 and a resistive film portion 942 electrically connecting the two electrode film portions 941. Each of the two electrode film portions 941 is formed to include a first position 924*a* and a second position 924*b* when viewed from a direction perpendicular to the surface 924. The resistive film portion 942 has a rectangular waveform shape or a meandering shape in which the first direction D1 is an amplitude direction, and forms a conductive path narrower than the electrode film portion 941 to electrically connect the two electrode film portions 941.

The sensor 910 functions as a strain gauge that detects strain occurring in the base material 920 by connecting an external wiring (not illustrated) to the two electrode film portions 941 and detecting a resistance of the conductive film pattern 940. Similarly to the conductive film pattern 40 illustrated in FIG. 2, in a plan view, the shape of the conductive film pattern 940 illustrated in FIG. 12 is a shape in which each of straight lines parallel to the first direction D1 passes across a conductive path center line of the conductive film pattern zero times or once but does not pass across the conductive path center line twice or more. The sensor 910 having the conductive film pattern 940 also exerts the same effects as the sensor 10 according to the first embodiment in terms of the common points with the sensor 10 according to the first embodiment.

Although the sensor according to the present disclosure has been described above with reference to a plurality of embodiments, the technical scope of the sensor according to the present disclosure is not limited to the above-described embodiments, and it is needless to say that many other embodiments and modifications are included. For example, the number of conductive film patterns formed on the outer bottom surface 24 of the base material 20 or the surface 924 of the base material 920 is not limited to one, two, or four, and three or five or more conductive film patterns may be formed on the outer bottom surface 24 of the base material 20 or the surface 924 of the base material 920.

As understood from the above descriptions, the present description discloses the following.

[1] A sensor including:

a base material having a surface on which streaks are formed along a first direction in a plan view; and a conductive film pattern formed on or above the surface and configured to connect mutually different positions in an in-plane direction of the surface in a shape in which a length of a conductive path is longer than a length of a straight line connecting the different positions, in which in a plan view, the shape of the conductive film pattern comprises a shape in which each of straight lines parallel to the first direction passes across a conductive path center line of the conductive film pattern zero times or once but does not pass across the conductive path center line twice or more.

[2] The sensor according to [1], in which the conductive film pattern comprises a plurality of conductive film patterns, the conductive film patterns include a first conductive film pattern connecting a first position to a second position, which are mutually different positions in the in-plane direction, in a first shape in which a length of a conductive path is longer than a length of a straight line connecting the first position to the second position, and a second conductive film pattern connecting a third position to a fourth position, which are mutually different positions in the in-plane direction, in a second shape in which a length of a conductive path is longer than a length of a straight line connecting the third position to the fourth position, and in a plan view, each of the straight lines parallel to the first direction passes across the first conductive film pattern but does not pass across the second conductive film pattern, passes across the second conductive film pattern but does not pass across the first conductive film pattern, or passes across neither the first conductive film pattern nor the second conductive film pattern, and does not pass across both the first conductive film pattern and the second conductive film pattern.

[3] The sensor according to [2], in which the conductive film patterns include a third conductive film pattern connecting a fifth position to a sixth position, which are mutually different positions in the in-plane direction, in a third shape in which a length of a conductive path is longer than a length of a straight line connecting the fifth position to the sixth position, and a center-to-center distance along the first direction between the first conductive film pattern and the second conductive film pattern is shorter than a center-to-center distance along the first direction between the first conductive film pattern and the third conductive film pattern and than a center-to-center distance along the first direction between the second conductive film pattern and the third conductive film pattern.

[4] The sensor according to [1], in which the conductive film pattern comprises a plurality of conductive film patterns, in a plan view, each of the straight lines parallel to the first direction passes across any one of the conductive film patterns or passes across none of the conductive film patterns, but does not pass across two or more of the conductive film patterns.

[5] The sensor according to any of [1] to [4], in which a surface roughness Ra of the surface with respect to a second direction perpendicular to the first direction in a plane of the surface is 0.05 μm or more and 1 μm or less.

[6] The sensor according to [5], in which the base material is a metal base material, an underlying insulating film is formed between the surface and the conductive film pattern, and a thickness of the underlying insulating film is one time to ten times the surface roughness Ra.

REFERENCE SIGNS LIST

10, 110, 210, 310, 410, 510, 610, 710, 810, 910: sensor
12: connecting member
12*a*: thread groove
12*b*: flow path
14: pressing member
18: sensor body
20, 920: base material
21: flange
22: bottom wall
23: pressure receiving inner surface
24: outer bottom surface
924: surface
24*a*, 224*a*, 324*a*, 424*a*, 524*a*, 624*a*, 724*a*, 824*a*, 924*a*: first position
24*b*, 224*b*, 324*b*, 424*b*, 524*b*, 624*b*, 724*b*, 824*b*, 924*b*: second position
324*c*, 424*c*, 524*c*, 624*c*, 724*c*: third position
324*d*, 424*d*, 524*d*, 624*d*, 724*d*: fourth position
424*e*, 524*e*, 724*e*: fifth position
424*f*, 524*f*, 724*f*: sixth position
424*g*, 524*g*, 724*g*: seventh position
424*h*, 524*h*, 724*h*: eighth position
25: streak
30, 930: underlying insulating film
40, 140, 240, 940: conductive film pattern
41, 241, 361, 461, 561, 661, 761, 861, 941, 351, 451, 551, 651, 751, 851, 471, 571,
771, 871, 481, 581, 781, 881: electrode film portion
42, 242, 942, 352, 452, 552, 652, 752, 852, 362, 462, 562, 662, 762, 862, 472, 572,
772, 872, 482, 582, 782, 882: resistive film portion
43, 143, 243: conductive path center line
45: etching residue
350, 450, 550, 650, 750, 850: first conductive film pattern
360, 460, 560, 660, 760, 860: second conductive film pattern
470, 570, 770, 870: third conductive film pattern
480, 580, 780, 880: fourth conductive film pattern
90: substrate
D1: first direction
D2: second direction
195: straight line

What is claimed is:

1. A sensor comprising:

a base material having a surface on which streaks are formed along a first direction in a plan view; and a conductive film pattern formed on or above the surface and configured to connect mutually different positions in an in-plane direction of the surface in a shape in which a length of a conductive path is longer than a length of a straight line connecting the different positions, wherein in a plan view, the shape of the conductive film pattern comprises a shape in which each of straight lines parallel to the first direction passes across a conductive path center line of the conductive film pattern zero times or once but does not pass across the conductive path center line twice or more.

2. The sensor according to claim 1, wherein the conductive film pattern comprises a plurality of conductive film patterns, the conductive film patterns include a first conductive film pattern connecting a first position to a second position, which are mutually different positions in the in-plane direction, in a first shape in which a length of a conductive path is longer than a length of a straight line connecting the first position to the second position, and a second conductive film pattern connecting a third position to a fourth position, which are mutually different positions in the in-plane direction, in a second shape in which a length of a conductive path is longer than a length of a straight line connecting the third position to the fourth position, and in a plan view, each of the straight lines parallel to the first direction passes across the first conductive film pattern but does not pass across the second conductive film pattern, passes across the second conductive film pattern but does not pass across the first conductive film pattern, or passes across neither the first conductive film pattern nor the second conductive film pattern, and does not pass across both the first conductive film pattern and the second conductive film pattern.

3. The sensor according to claim 2, wherein the conductive film patterns include a third conductive film pattern connecting a fifth position to a sixth position, which are mutually different positions in the in-plane direction, in a third shape in which a length of a conductive path is longer than a length of a straight line connecting the fifth position to the sixth position, and a center-to-center distance along the first direction between the first conductive film pattern and the second conductive film pattern is shorter than a center-to-center distance along the first direction between the first conductive film pattern and the third conductive film pattern and than a center-to-center distance along the first direction between the second conductive film pattern and the third conductive film pattern.

4. The sensor according to claim 1, wherein the conductive film pattern comprises a plurality of conductive film patterns, in a plan view, each of the straight lines parallel to the first direction passes across any one of the conductive film patterns or passes across none of the conductive film patterns, and does not pass across two or more of the conductive film patterns.

5. The sensor according to claim 1, wherein a surface roughness Ra of the surface with respect to a second direction perpendicular to the first direction in a plane of the surface is 0.05 μm or more and 1 μm or less.

6. The sensor according to claim 5, wherein the base material is a metal base material, an underlying insulating film is formed between the surface and the conductive film pattern, and a thickness of the underlying insulating film is one time to ten times the surface roughness Ra.

* * * * *